US012773861B2

(12) United States Patent
Khoo

(10) Patent No.: US 12,773,861 B2
(45) Date of Patent: Oct. 27, 2026

(54) IMAGE FORMING APPARATUS

(71) Applicant: Er Sin Khoo, Kanagawa (JP)

(72) Inventor: Er Sin Khoo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 19/083,508

(22) Filed: Mar. 19, 2025

(65) Prior Publication Data

US 2025/0296365 A1 Sep. 25, 2025

(30) Foreign Application Priority Data

Mar. 22, 2024 (JP) ................................ 2024-045945

(51) Int. Cl.

*B41J 11/70* (2006.01)
*B26D 1/18* (2006.01)
*B26D 7/26* (2006.01)
*B65H 35/04* (2006.01)

(52) U.S. Cl.

CPC ............... *B41J 11/70* (2013.01); *B26D 1/185* (2013.01); *B26D 7/2614* (2013.01); *B65H 35/04* (2013.01)

(58) Field of Classification Search

CPC ....... B41J 11/70; B41J 11/706; B26D 7/2614; B65H 35/04

See application file for complete search history.

(56) References Cited

U.S. PATENT DOCUMENTS

| | | | | |
|---|---|---|---|---|
| 9,446,609 | B2 * | 9/2016 | Yamashita | B26D 5/02 |
| 10,815,095 | B2 * | 10/2020 | Honda | B41J 11/70 |
| 11,607,896 | B2 * | 3/2023 | Endo | B26D 1/245 |
| 2005/0051011 | A1 * | 3/2005 | Onishi | B26D 11/00 83/563 |
| 2012/0222531 | A1 | 9/2012 | Ogawa et al. | |
| 2024/0157710 | A1 | 5/2024 | Khoo | |
| 2024/0399772 | A1 * | 12/2024 | Kobayashi | B26D 7/20 |

FOREIGN PATENT DOCUMENTS

| | | | | | |
|---|---|---|---|---|---|
| JP | 2002205869 | A | * | 7/2002 | |
| JP | 2003-225886 | A | | 8/2003 | |
| JP | 2004-034637 | A | | 2/2004 | |
| JP | 2012-183602 | A | | 9/2012 | |
| JP | 2017030230 | A | * | 2/2017 | |
| WO | WO-2007026469 | A1 | * | 3/2007 | B26D 7/025 |

* cited by examiner

*Primary Examiner* — Christle I Marshall

(74) *Attorney, Agent, or Firm* — Harness, Dickey & P.L.C.

(57) ABSTRACT

An image forming apparatus includes an image former, a cutting device, and a mover. The image former forms an image on a front surface of a sheet and ejects the sheet from an ejection port in a first direction. The cutting device includes a first support, a cutter, and a cutter mover. The first support supports a portion of the sheet hanging down from the ejection port of the image former in a vertical direction intersecting the first direction, the first support supporting a reverse surface opposite to the front surface of the sheet. The cutter cuts the sheet supported by the first support. The cutter mover moves the cutter in a second direction, intersecting the first direction and the vertical direction, along the portion supported by the first support to cut the sheet in the second direction. The mover changes a position of the cutter in the first direction.

3 Claims, 8 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Application No. 2024-045945, filed on Mar. 22, 2024, in the Japan Patent Office, the entire disclosure of which is hereby incorporated by reference herein.

BACKGROUND

Technical Field

Embodiments of the present disclosure relate to an image forming apparatus.

Related Art

An image forming apparatus is known that includes an image former and a cutting device. The image former ejects a recording sheet on which an image has been formed from an ejection position. The cutting device moves a cutter in a sheet-width direction to cut the recording sheet.

For example, a serial-type inkjet printer (image forming apparatus) has been disclosed that forms an image on a roll sheet as a recording sheet wound out from a roll, in which a cutter is moved in a sheet-width direction of the roll sheet to cut the roll sheet into a predetermined length. Such an image forming apparatus includes a carriage that faces the roll sheet held such that the face of the roll sheet is substantially horizontal, and the carriage scans a front side of the roll sheet to form an image. The cutter is disposed inside the image forming apparatus. The cutter moves in the sheet-width direction to cut the roll sheet, which is held such that the face of the roll sheet is substantially horizontal.

SUMMARY

In an embodiment of the present disclosure, an image forming apparatus includes an image former, a cutting device, and a mover. The image former forms an image on a front surface of a sheet and ejects the sheet, on which the image is formed on the front surface, from an ejection port in a first direction. The cutting device includes a first support, a cutter, and a cutter mover. The first support supports a portion of the sheet hanging down from the ejection port of the image former in a vertical direction intersecting the first direction, the first support supporting a reverse surface opposite to the front surface of the sheet. The cutter cuts the sheet supported by the first support. The cutter mover moves the cutter in a second direction, intersecting the first direction and the vertical direction, along the portion supported by the first support to cut the sheet in the second direction. The mover changes a position of the cutter in the first direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a diagram illustrating the cutter unit in which top-face pressing members are positioned at standby positions; and FIG. 6B is a diagram illustrating the cutter unit in which front-surface pressing members are positioned at extended positions;

Figure 1:
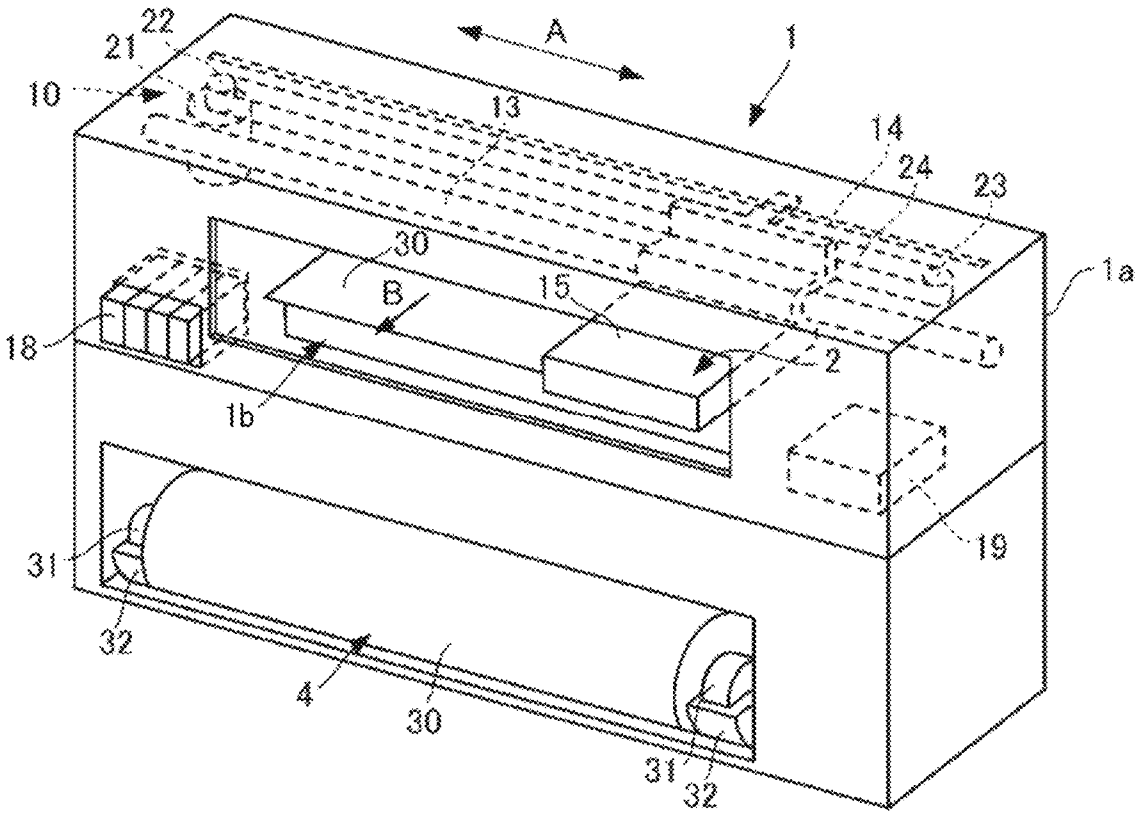
FIG. 1 is a perspective view of an inkjet printer, illustrating a configuration of the inkjet printer.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of an inkjet-type printer, which may also be referred to simply as an inkjet printer in the following description, as an image forming apparatus according to embodiments of the present disclosure.

FIG. 1 is a perspective view of an inkjet printer 1, illustrating a configuration of the inkjet printer 1.

Figure 2:
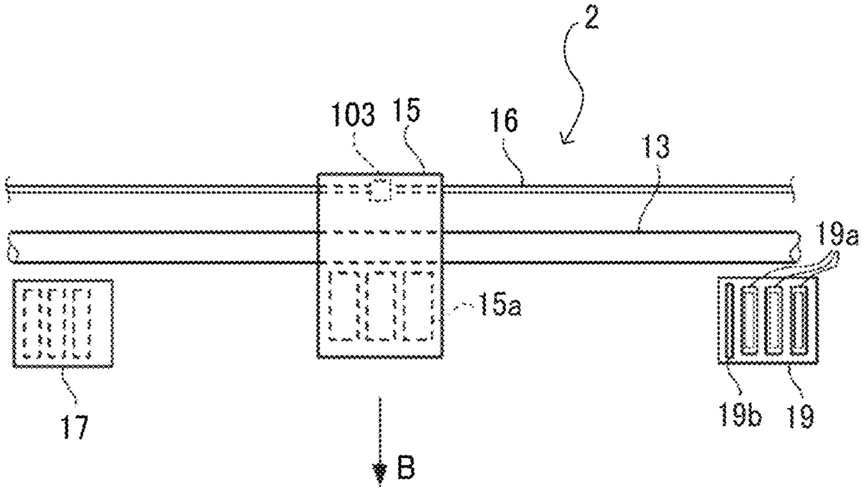
FIG. 2 is a plan view of a relevant part of an image former provided for the inkjet printer of FIG. 1.

FIG. 2 is a plan view of a relevant part of an image former 2 provided for the inkjet printer 1.

Figure 3:
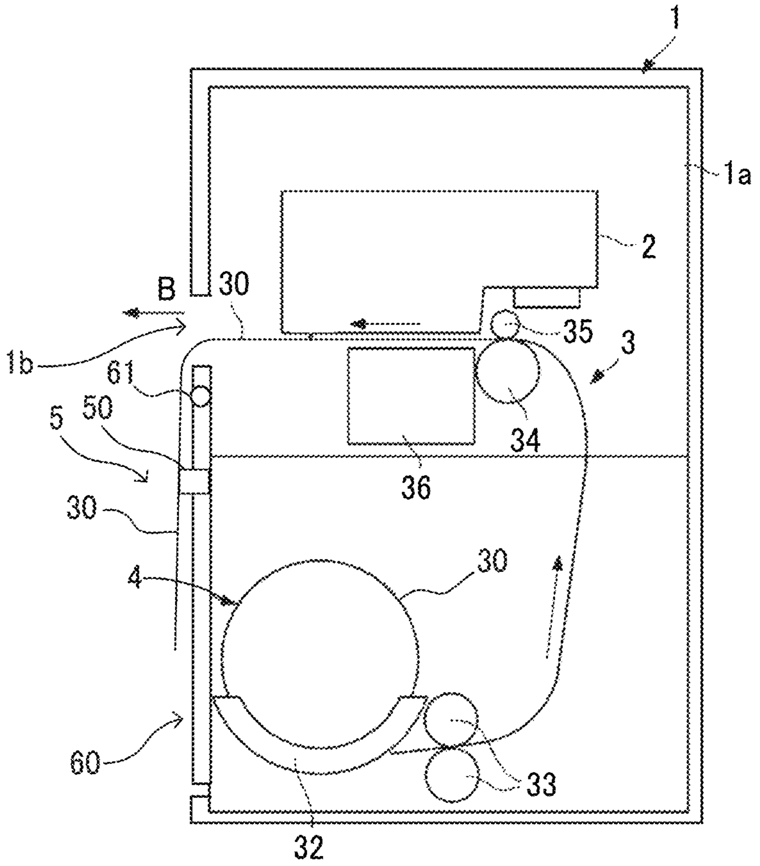
FIG. 3 is a schematic side view of the inkjet printer of FIG. 1, illustrating a configuration of the inkjet printer.

FIG. 3 is a schematic side view of the inkjet printer 1, illustrating a configuration of the inkjet printer 1.

Figure 4:
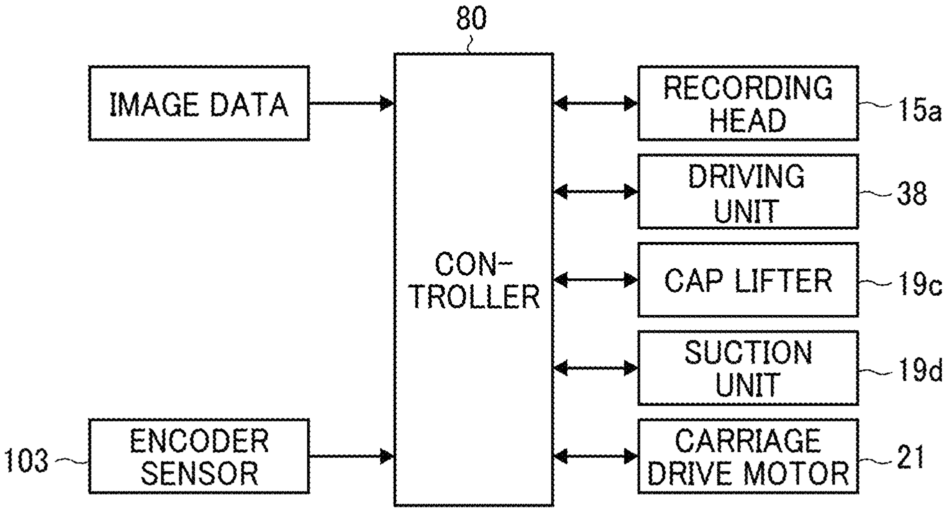
FIG. 4 is a block diagram of a control configuration of a main part of the inkjet printer of FIG. 1.

FIG. 4 is a block diagram of a control configuration of a main part of the inkjet printer 1.

As illustrated in FIGS. 1 and 2, the inkjet printer 1 of the present embodiment is a so-called serial-type inkjet recording apparatus. The serial-type inkjet recording apparatus discharges liquid while scanning an inkjet head in a width direction of a sheet to form a recording line of an image, and conveys the sheet after one or multiple scans are completed to forms a next recording line of the image.

As illustrated in FIG. 3, the inkjet printer 1 includes an image former 2, a sheet conveyor 3, a roll-sheet container 4, a sheet cutting device 5 as a cutting device, and a controller 80. Among the above-described units, the image former 2, the sheet conveyor 3, the roll-sheet container 4, and the controller 80 other than the sheet cutting device 5 are disposed inside a body 1*a* of the inkjet printer 1, and the sheet cutter 5 is disposed outside the body 1*a*.

As illustrated in FIG. 1, the image former 2 includes a guide rod 13 and a guide rail 14 stretched between both side plates of the body 1*a*, and a carriage unit 15 is slidably held by the guide rod 13 and the guide rail 14 in a direction indicated by arrow A. In the present embodiment, the carriage unit 15 is slidably held means that the carriage unit 15 moves in the direction indicated by arrow A on the guide rod 13 and the guide rail 14 while being in contact with the guide rod 13 and the guide rail 14.

The carriage unit 15 mounts recording heads 15*a* (see FIG. 2) as liquid discharge heads that discharge liquids (inks) of respective colors of black (K), yellow (Y), magenta (M), and cyan (C). Each of the recording heads 15*a* integrally includes a sub-tank for supplying ink.

As illustrated in FIG. 1, the main-scanning mechanism 10 includes a carriage drive motor 21 disposed on the left side of the body 1*a* in a sheet-width direction (the left side as viewed from the front side of the body 1*a*). The main-scanning mechanism 10 includes a driving pulley 22, a driven pulley 23, and a belt 24. The driving pulley 22 is rotationally driven by the carriage drive motor 21. The driven pulley 23 is disposed on the right side on the front side of the body 1*a* in the sheet-width direction (the right side when viewed from the apparatus front surface). The belt 24 is wound around the above-described pulleys.

The driven pulley 23 is pressed outward in a direction away from the drive pulley 22 by a tension spring to apply tension to the driven pulley 23. The belt 24 is partially fixed and held by a belt fixing member disposed on the rear side of the carriage unit 15. By so doing, the belt 24 pulls the carriage unit 15 in the sheet-width direction.

As illustrated in FIG. 2, an encoder sheet 16 is disposed along the sheet-width direction of the carriage unit 15 to detect the position of the carriage unit 15 in the main-scanning direction. An encoder sensor 103 that is disposed inside the carriage unit 15 reads the encoder sheet 16 to detect the position of the carriage unit 15 in the main-scanning direction.

In a recording area of the carriage unit 15 within an area in which the carriage unit 15 moves in the main scanning direction, the roll sheet 30 as a sheet is intermittently conveyed in a direction orthogonal to the sheet-width direction, in other words, in a sheet conveyance direction (a direction indicated by arrow B in FIGS. 1 and 2) by the sheet conveyor 3.

In addition, a main cartridge 18 is detachably mounted outside an area in which the carriage unit 15 moves in the sheet-width direction or in a left-end of the front side of the body 1*a*, in the main scanning region (see FIG. 1). The main cartridge 18 contains ink of each color to be supplied to a sub-tank of the recording head 15*a*.

As illustrated in FIG. 2, a dummy discharge receiver 17 is disposed in a dummy discharge position (left side in FIG. 2) in the area in which the carriage unit 15 moves. The dummy discharge receiver 17 receives ink droplets when a dummy discharge operation is performed to discharge ink droplets that do not contribute to image recording to discharge thickened ink. Each of the recording heads 15*a* performs dummy discharge at the dummy discharge position for maintenance and recovery of discharging performance when a predetermined condition is satisfied.

A maintenance mechanism 19 that maintains and recovers the recording head 15*a* is disposed at a capping position, which is located at a carriage home position (right side in FIG. 2) in the area in which the carriage unit 15 moves.

The maintenance mechanism 19 includes caps 19*a* and a wiper blade 19*b*. Each of the caps 19*a* caps a nozzle face of the recording head 15*a*. The wiper blade 19*b* wipes the nozzle faces of the recording heads 15*a*. The maintenance mechanism 19 includes a cap lifter 19*c* (see FIG. 4) and a suction unit 19*d* (see FIG. 4).

The cap lifter 19*c* lifts and lowers the caps 19*a* and the wiper blade 19*b*. The suction unit 19*d* is connected to the caps 19*a* to suck liquid when the nozzle faces are capped. The cap lifter 19*c* is driven when, for example, printing operation is finished or when a cutter unit described below functions abnormally. By so doing, the nozzle faces of the recording heads 15*a* are capped.

In addition, when the suction unit 19*d* is driven with each nozzle face capped, a space inside the cap 19*a* is set to a negative pressure. Accordingly, ink can be discharged from nozzles into the cap 19*a*. The waste ink that is discharged from nozzles is discharged to a waste liquid tank.

Depending on the specifications of the image forming apparatus, for example, a dummy discharge receiver may be disposed at the carriage home position and the dummy discharge receiver may be included in the maintenance mechanism 19, similar to the cap 19*a* and the wiper blade 19*b*. Alternatively, the dummy discharge receivers may be disposed at both the carriage home position and the dummy discharge position.

The roll-sheet container 4 is a sheet feeder, and the roll sheet 30 as a sheet for image recording is set in the roll-sheet container 4. Roll sheets of different sizes in the sheet-width direction can be set in the roll-sheet container 4.

Flanges 31 are attached to the roll shaft of the roll sheet 30 and the flanges 31 attached to the roll shaft are mounted on respective flange receivers 32 from both sides in the sheet-width direction. Thus, the roll sheet 30 is stored in the roll-sheet container 4. A support roller is disposed inside the flange receiver 32, and the support roller contacts the outer periphery of the flange 31 to rotate the flange 31. By so doing, the roll sheet 30 is fed to the sheet conveyance path.

As illustrated in FIG. 3, the sheet conveyor 3 includes a pair of sheet feeding rollers 33, a registration roller 34, a registration pressure roller 35, and a sheet suction conveyance mechanism 36. The sheet conveyor 3 includes a driving unit 38 (see FIG. 4) including, for example, a driving motor for driving the pair of sheet feeding rollers 33, the registration roller 34, and the registration pressure roller 35. The pair of sheet feeding rollers 33 feeds the roll sheet 30 from the roll-sheet container 4 to the sheet conveyance path.

The registration roller 34 and the registration pressure roller 35 are disposed upstream from the image former 2 in the sheet conveyance direction, and convey the fed roll sheet 30 to the sheet cutting device 5 through the lower side of the image former 2.

The sheet suction conveyance mechanism 36 is disposed below the image former 2 with the sheet conveyance path therebetween, and performs a suction operation to suck the roll sheet 30 onto a platen plate disposed on a top side of the sheet suction conveyance mechanism 36. Accordingly, the roll sheet 30 that is conveyed below the image former 2 is maintained flat on the platen plate.

The roll sheet 30 that is fed from the roll-sheet container 4 is conveyed by the sheet conveyor 3 from the rear (right side in FIG. 3) to the front (left side in FIG. 3) of the body 1*a* to a predetermined recording area located below the image former 2.

When the roll sheet 30 is conveyed to the recording area, the carriage unit 15 reciprocates in the sheet-width direction, and liquid (ink droplets) is discharged by the recording heads 15*a* in accordance with image data. While the roll sheet 30 is intermittently conveyed, the reciprocal movement of the carriage unit 15 and the discharge of the liquid by the recording head 15*a* (see FIG. 2) are repeated. By so doing, images are continuously formed on the roll sheet 30. Finally, a desired image corresponding to the image data is formed on the roll sheet 30.

The roll sheet 30 on which the image has been formed is discharged from an ejection port 1*b* as an ejection position of the body 1*a*. The roll sheet 30 that is ejected from the ejection port 1*b* hangs down from the ejection port 1*b* as illustrated in FIG. 3 when a post-processing apparatus is not connected to the inkjet printer 1. The roll sheet 30 hanging down from the ejection port 1*b* is cut into a predetermined size by the sheet cutting device 5.

Next, a description is given of the sheet cutting device 5 according to the present embodiment.

Figure 5:
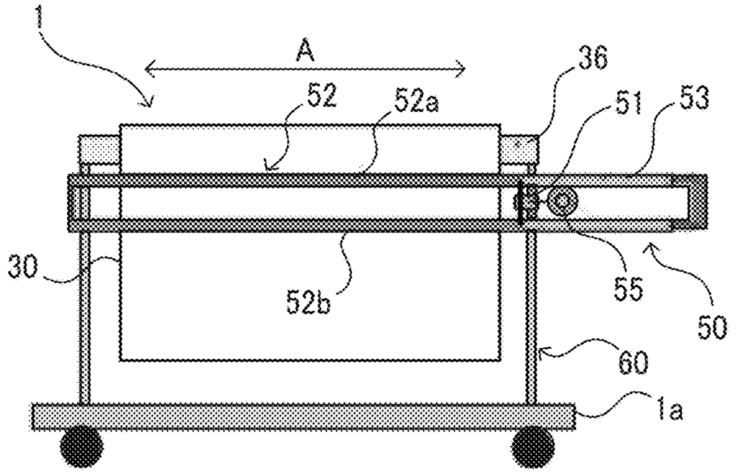
FIG. 5 is a front view of the inkjet printer of FIG. 1, illustrating a configuration of a sheet cutting device.

FIG. 5 is a front view of the sheet cutting device 5.

The sheet cutting device 5 cuts a portion of the roll sheet 30, which is a recording sheet hanging from the ejection port 1*b* of the body 1*a* of the inkjet printer 1. The sheet cutting device 5 includes a cutter unit 50 and a rotation lifting mechanism 60 as a mover to move the cutter unit 50.

Figure 6A:
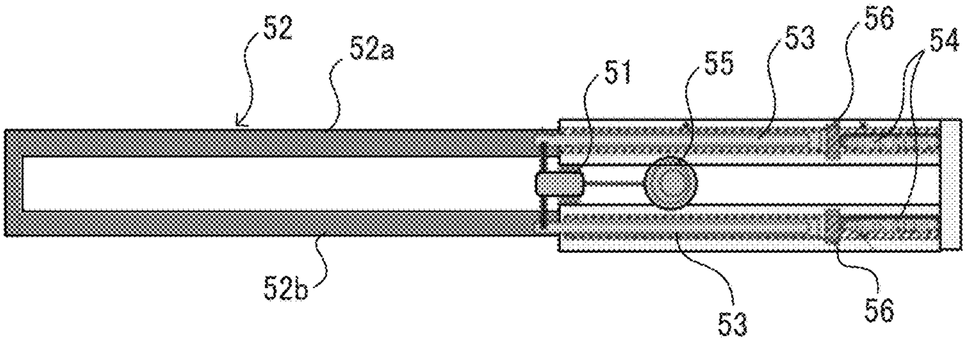
FIGS. 6A and 6B are front views of a cutter unit of the sheet cutting device of FIG. 5, illustrating a configuration of the cutter unit.
Figure 6B:
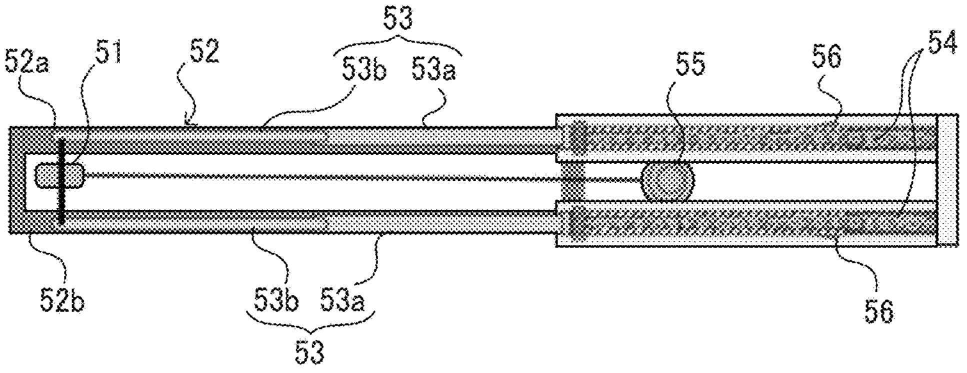

FIGS. 6A and 6B are front views of the cutter unit 50 of the sheet cutting device 5, illustrating a configuration of the cutter unit 50. FIG. 6A is a diagram illustrating the front-surface pressing members 53 and the periphery thereof, in which the front-surface pressing members 53 are positioned at standby positions and a cutter housing 51 is positioned at a first retracted position. FIG. 6B is a diagram illustrating the front-surface pressing members 53 and the periphery thereof, in which the front-surface pressing members 53 are positioned at protruding positions and the cutter housing 51 is positioned at a second retracted position.

The cutter unit 50 includes the cutter housing 51, a reverse-surface support 52, the front-surface pressing members 53, push-out springs 54, a return mechanism 55, and locking units 56.

The cutter housing 51 includes a cutter 51*a* for cutting the roll sheet 30.

The cutter 51*a* includes, for example, two circular cutters disposed at positions opposing each other with the roll sheet 30 interposed between the two circular cutters, and is rotatably held by the cutter housing 51. The cutter 51*a* is rotated by a driving force generated in accordance with the movement of the cutter housing 51 in the sheet-width direction, i.e., a direction indicated by arrow A in FIG. 5.

The cutter 51*a* that includes the circular cutters cuts the roll sheet 30 while rotating. Accordingly, the cutter 51*a* can cut a relatively thick roll sheet. Since the cutter 51*a* includes the circular cutters, the cutter 51*a* can prevent an only a predetermined portion of the circular cutters from wearing significantly as in a case of a fixed blade.

The reverse-surface support 52, as a first support, supports the reverse surface of the roll sheet 30 on which an image is not formed, of the roll sheet 30 hanging down from the ejection port 1*b*. The reverse-surface support 52 includes two rod-shaped members 52*a* and 52*b* extending in the sheet-width direction. The two rod-shaped members 52*a* and 52*b* are disposed substantially parallel to the conveyance direction of the roll sheet 30, i.e., the vertical direction in which the roll sheet 30 hangs down, and are disposed at positions opposing the reverse surface of the roll sheet 30 hanging down from the ejection port 1*b*.

The front-surface pressing members 53 press the roll sheet 30 from the upper side of the roll sheet 30, i.e., a side of the roll sheet 30 on which an image is formed, of the roll sheet 30 hanging down from the ejection position 1*b*. The front-surface pressing member 53 holds the roll sheet 30 to sandwich the roll sheet 30 between the front-surface pressing member 53 and the reverse-surface support 52. The front-surface pressing members 53 are rod-shaped members each having a multi-stage (two stages in the present embodiment) extendable structure. Specifically, in the front-surface pressing member 53, an inner pipe 53*b* is disposed inside an outer pipe 53*a* and the inner pipe 53*b* can protrude from and retract into the outer pipe 53*a*.

The front-surface pressing members 53 are connected to the respective push-out springs 54. The push-out springs 54 apply a biasing force to push the respective front-surface pressing members 53 in the sheet-width direction from the right side to the left side in FIGS. 6A and 6B. When the push-out springs 54 exert the biasing force, the front-surface pressing members 53 in each of which the inner pipe 53*b* is accommodated in the outer pipe 53*a*, i.e., the standby positions of FIG. 6A, are pushed out by the push-out springs 54.

Accordingly, as illustrated in FIG. 6B, the outer pipes 53*a* each move to a position facing the rod-shaped members 52*a* and 52*b* of the reverse-surface support 52. At the same time, the inner pipes 53*b* protrude from the respective outer pipes 53*a* and face the rod-shaped members 52*a* and 52*b* of the reverse-surface support 52.

The front-surface pressing members 53 each has an engaging portion which engages with the locking unit 56. At the standby positions of FIG. 6A, the engaging portions of the front-surface pressing members 53 engage with the respective locking units 56, and the front-surface pressing members 53 are prevented from being pushed out by the biasing force of the push-out springs 54. For example, when the locking units 56 are manually operated to release engagement between the engagement portions of the front-surface pressing members 53 and the locking units 56, the front-surface pressing members 53 at the standby positions illustrated in FIG. 6A are pushed out by the biasing force of the push-out springs 54 and extend to the extended positions as illustrated in FIG. 6B.

Figure 7:
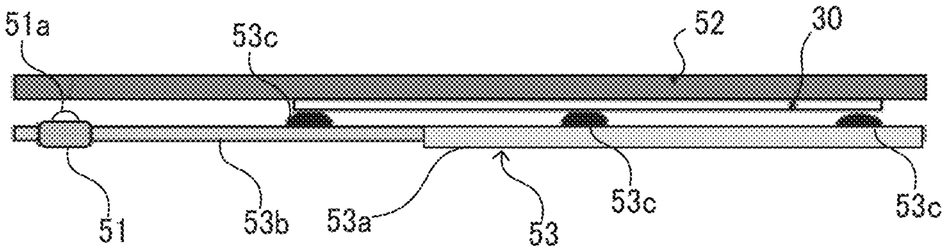
FIG. 7 is a diagram illustrating the front-surface pressing members of FIGS. 6A and 6B and the periphery thereof in which the front-surface pressing members are positioned at extended positions when the front-surface pressing members are pushed out by the biasing force of push-out springs.

FIG. 7 is a diagram illustrating the front-surface pressing members 53 and the periphery of the front-surface pressing members 53 in which the front-surface pressing members 53 are pushed out by the biasing force of the push-out springs 54, as illustrated in FIG. 6B.

The front-surface pressing members 53 each includes multiple pressing members 53*c* in the sheet-width direction. The multiple pressing members 53*c* contact the upper face of the roll sheet 30 and hold the roll sheet 30 between the rod-shaped members 52*a* and 52*b* of the reverse-surface support 52. When the bottom face (rear side) of the roll sheet 30 hanging down from the ejection port 1*b* is supported by the reverse-surface support 52, the front-surface pressing members 53 at the standby positions illustrated in FIG. 6A are pushed out by the biasing force of the push-out spring 54 and extend to the extended positions illustrated in FIG. 6B. At this time, the roll sheet 30 is held between the reverse-surface support 52 and the front-surface pressing members 53.

Next, a description is given of a cutter mover for moving the cutter housing 51 in the sheet-width direction.

Figure 8A:
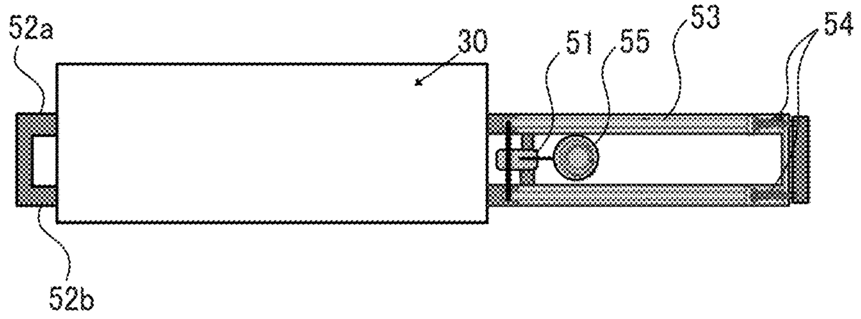
FIG. 8A is a diagram illustrating a cutter housing of the cutter unit of FIGS. 6A and 6B and the periphery thereof in which the cutter housing is positioned at a first retracted position.
Figure 8B:
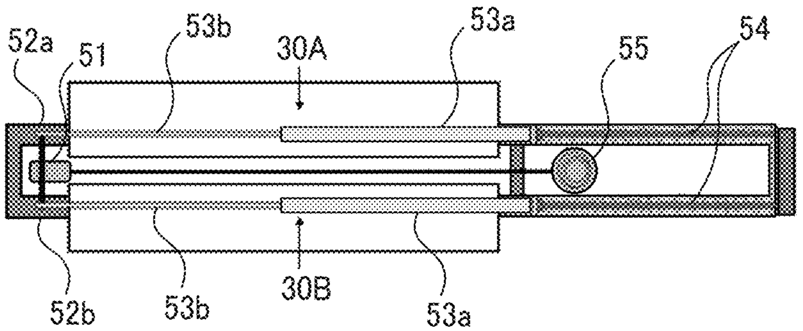
FIG. 8B is a diagram illustrating the cutter housing and the periphery thereof in which the cutter housing is positioned at a second retracted position.

FIG. 8A is a diagram illustrating the cutter housing 51 and the periphery thereof in which the cutter housing 51 is positioned at the first retracted position. FIG. 8B is a diagram illustrating the cutter housing 51 and the periphery thereof in which the cutter housing 51 is positioned at the second retracted position.

The cutter housing 51 is fixed to ends of the inner pipes 53*b* of the front-surface pressing member 53. When the front-surface pressing members 53 are positioned at the standby positions, the cutter housing 51 is positioned at the first retracted position illustrated in FIG. 8A. At the first retracted position, the cutter housing 51 is positioned outside of one end of the roll sheet 30 in the sheet-width direction.

The cutter housing 51 that is located at the first retracted position moves in the sheet-width direction between the two rod-shaped members 52*a* and 52*b* of the reverse-surface support 52 in conjunction with the movement of the front-surface pressing member 53 in the standby mode as illustrated in FIG. 6A, pushed out by the biasing force of the push-out spring 54. Accordingly, the roll sheet 30 that is held between the reverse-surface support 52 and the front-surface pressing member 53 is cut by the cutter 51*a* of the cutter housing 51.

When, for example, the locking unit 56 is manually operated and the front-surface pressing members 53 are pushed out by the biasing force of the push-out springs 54, the cutter housing 51 passes through the roll sheet 30 and moves to the second retracted position illustrated in FIG. 8B.

Accordingly, the cutter housing 51 that has cut the roll sheet 30 moves to the second retracted position outside the other end of the roll sheet 30 in the sheet-width direction after the cutter housing 51 cuts the roll sheet 30. The front-surface pressing members 53 that are pushed out to the extended positions illustrated in FIG. 6B by the biasing force of the push-out spring 54 are maintained at the extended positions by the biasing force of the push-out spring 54. Accordingly, the cutter housing 51 that has moved to the second retracted position is also maintained at the second retracted position after the cutter housing 51 cuts the roll sheet 30.

As illustrated in FIG. 8B, the roll sheet 30 is cut by the cutter housing 51 into a roll sheet 30A, i.e., an upstream portion of the cut roll sheet 30 and a roll sheet 30B, i.e., a downstream portion of the cut roll sheet 30. Both the roll sheet 30A and the roll sheet 30B are continuously held between the reverse-surface support 52.

Accordingly, the roll sheet 30A and the roll sheet 30B can be prevented from falling off. The cut roll sheet 30B that has been cut off can be, for example, manually pulled out from between the reverse-surface support 52 and the front-surface pressing members 53.

When the cutter housing 51 that has been moved to the second retracted position is returned to the first retracted position, for example, the return mechanism 55 is manually operated. The return mechanism 55 includes, for example, a spiral spring, and one end of the spiral spring is fixed to the cutter housing 51.

When the spiral spring of the return mechanism 55 is manually winded, the cutter housing 51 moves from the second retracted position illustrated in FIG. 8B to the first retracted position illustrated in FIG. 8A. In conjunction with the movement of the return mechanism 55, the front-surface pressing members 53 at the extended positions illustrated in FIG. 6B move to the standby positions illustrated in FIG. 6A against the biasing force of the push-out springs 54.

When the cutter housing 51 moves to the first retracted position, the engaging portions of the front-surface pressing members 53 engage with the respective locking units 56, the front-surface pressing members 53 are maintained at the standby positions illustrated in FIG. 6A, and the cutter housing 51 is maintained at the first retracted position illustrated in FIG. 8A.

In the present embodiment, the force with which the cutter mover of the sheet cutting device 5 moves the cutter housing 51 between the first retracted position and the second retracted position is the biasing force of the push-out springs 54 and a force of the operator to move the return mechanism 55. For this reason, the cutter mover of the sheet cutting device 5 is an unpowered mechanism that does not use the power of an electric motor movable by electric power. Accordingly, the cutter mover does not require electrical control and can cut the roll sheet 30 without the supply of electric power.

A post-processing apparatus 100 that performs a predetermined post-processing on the roll sheet 30 ejected from the body 1*a* can be connected to the inkjet printer 1 of the present embodiment. For this reason, the operator of the inkjet printer 1 of the present embodiment can select a first usage mode in which the inkjet printer 1 is operated without the post-processing apparatus 100 connected to the inkjet printer 1 as illustrated in FIG. 9A or a second usage mode in which the inkjet printer 1 is operated with the post-processing apparatus 100 connected to the inkjet printer 1 as illustrated in FIG. 9B.

Figure 9A:
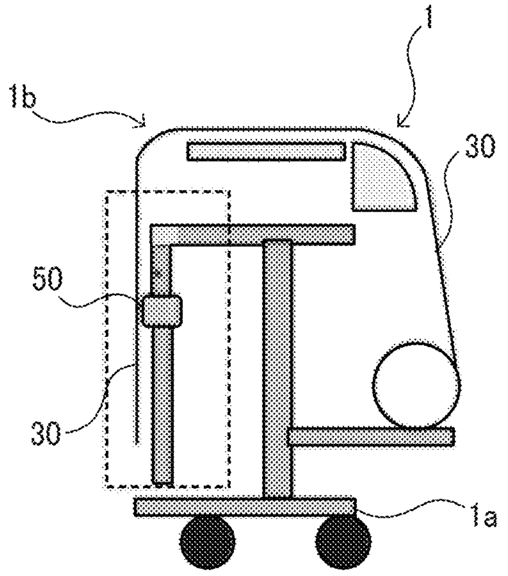
FIG. 9A is a schematic side view of the inkjet printer of FIG. 1, in a first usage mode in which a post-processing apparatus is not connected to the inkjet printer, illustrating a posture of a portion of the roll sheet hanging down.
Figure 9B:
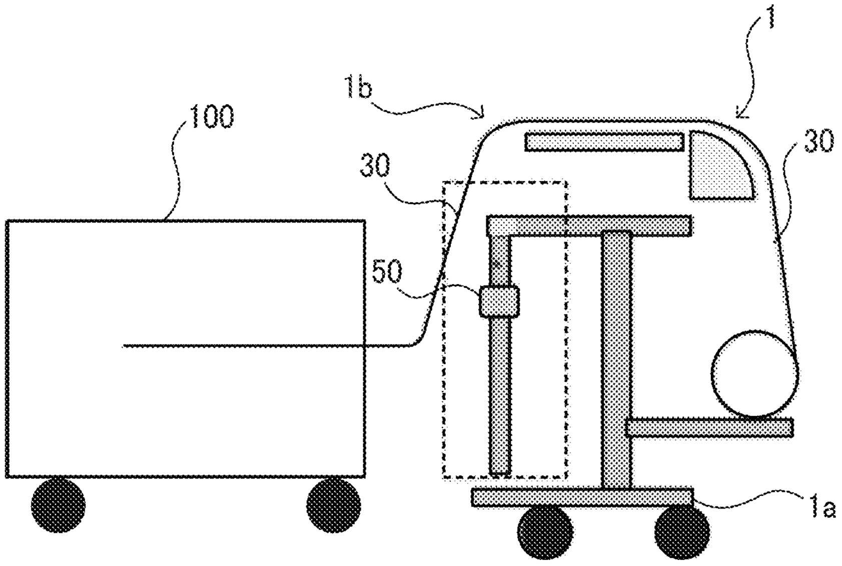
FIG. 9B is a schematic side view of the inkjet printer of FIG. 1, in a second usage mode in which a post-processing apparatus is connected to the inkjet printer, illustrating a posture of a portion of the roll sheet hanging down.

As illustrated in FIGS. 9A and 9B, the posture of the roll sheet 30 that hangs down varies depending on the usage mode, in other words, whether the post-processing apparatus 100 is connected to the inkjet printer 1. As described above, when the posture of the roll sheet 30 that hangs down varies, the position at which the roll sheet 30 passes through a height position of the cutter unit 50 is shifted in the horizontal direction.

Accordingly, for example, in the first usage mode illustrated in FIG. 9A, the roll sheet 30 hangs down to contact the reverse-surface support 52 of the cutter unit 50. However, in the second use mode illustrated in FIG. 9B, the roll sheet 30 may hang down away from the reverse-surface support 52 of the cutter unit 50. When the roll sheet 30 hangs down away from the reverse-surface support 52 of the cutter unit 50, the cutter housing 51 of the cutter unit 50 may not be able to cut the roll sheet 30 appropriately.

The case in which the roll sheet 30 hangs down away from the reverse-surface support 52 of the cutter unit 50 is not limited to the difference between the first usage mode and the second usage mode described above, in other words, regardless of whether the post-processing apparatus 100 is connected to the inkjet printer 1. For example, the posture of the roll sheet 30 that hangs down may vary depending on the type such as sheet stiffness, of the roll sheet 30. Accordingly, the position at which the roll sheet 30 passes the height position of the cutter unit 50 may be shifted in the horizontal direction.

In addition, for example, the posture of the hanging roll sheet 30 may vary depending on the type of the post-processing apparatus 100 connected to the inkjet printer 1 (for example, the height of an inlet for receiving the roll sheet 30). Accordingly, the position at which the roll sheet 30 passes through the height position of the cutter unit 50 may be shifted in the horizontal direction.

Figure 10A:
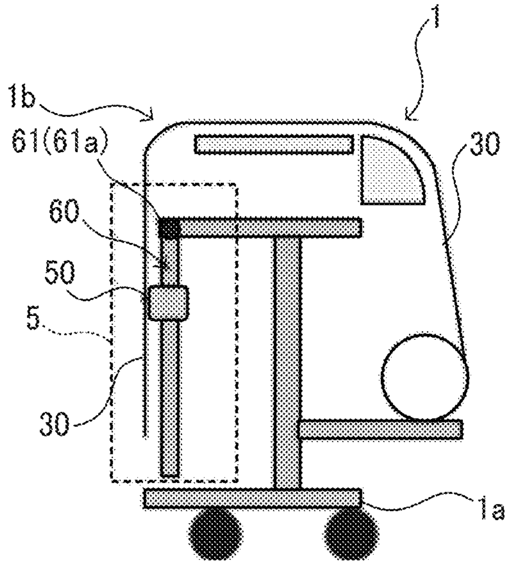
FIG. 10A is a schematic side view of the inkjet printer of FIG. 1, in the first usage mode of FIG. 9A in which the rotation position of a frame of a rotation lifting mechanism is adjusted to correspond to the posture of a portion of a roll sheet when the roll sheet hangs down.
Figure 10B:
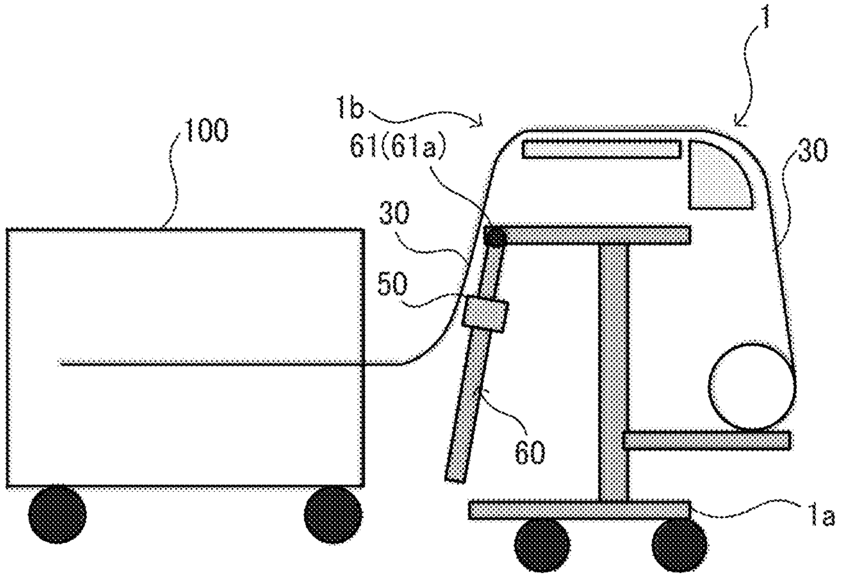
FIG. 10B is a schematic side view of the inkjet printer of FIG. 1, in the second usage mode of FIG. 9B in which the post-processing apparatus is connected with the inkjet printer in which the rotation position of a frame of a rotation lifting mechanism is adjusted to correspond to the posture of a portion of a roll sheet when the portion of the roll sheet hangs down.

FIG. 10A is a schematic side view of the inkjet printer 1 in which the rotation position of a frame of the rotation lifting mechanism 60 is adjusted to correspond to the posture of the roll sheet 30 when the roll sheet 30 hangs down in the first usage mode, according to the present embodiment. FIG. 10B is a schematic side view of the inkjet printer 1 connected with the post-processing apparatus, in which the rotation position of the frame of the rotation lifting mechanism 60 is adjusted to correspond to the posture of the roll sheet 30 when the roll sheet 30 hangs down in the second usage mode.

Figure 11:
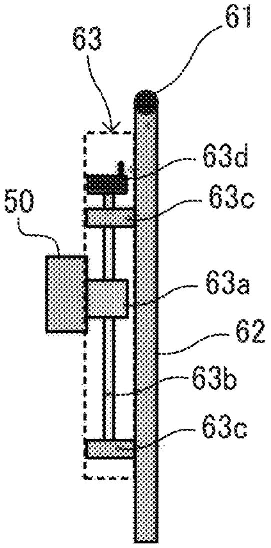
FIG. 11 is a diagram illustrating a configuration of the rotation lifting mechanism of FIGS. 10A and 10B.

FIG. 11 is a diagram illustrating a configuration of the rotation lifting mechanism 60 of the sheet cutting device 5 of the present embodiment.

The sheet cutting apparatus 5 of the present embodiment includes the rotation lifting mechanism 60 as a mover to move the cutter unit 50 such that the position of the reverse-surface support 52 of the cutter unit 50 in the horizontal direction changes.

Specifically, the rotation lifting mechanism 60 of the present embodiment is disposed in the vicinity of a lower portion of the ejection port 1*b*. The rotation lifting mechanism 60 includes a frame 62 as a rotation support, i.e., a second support, which rotatably supports the cutter unit 50 about a rotary shaft 61 extending in the sheet-width direction. An upper end of the frame 62 is rotatably supported by the rotary shaft 61.

A lifting and lowering unit 63, i.e., an elevator, that lifts and lowers the cutter unit 50 in the longitudinal direction, i.e., the vertical direction, of the frame 62 is attached to the frame 62, and the cutter unit 50 is attached to the frame 62 via the lifting and lowering unit 63.

The rotation lifting mechanism 60 includes a rotation fix member 61*a*, i.e., a first fix member to fix the frame 62 holding the cutter unit 50 at one of multiple rotation positions about the rotary shaft 61. The rotation fix member 61*a* is, for example, a fixing screw for preventing the frame 62 from rotating about the rotary shaft 61.

The rotation fix member 61*a* can be manually unscrewed. By so doing, the frame 62 can be operated to be rotatable about the rotary shaft 61. When the screw of the rotation fix member 61*a* is loosened in a state in which the frame 62 is fixed at a predetermined rotation position, the frame 62 can be prevented from rotating about the rotary shaft 61, and the rotation position of the frame 62 is fixed.

In the present embodiment, the rotation position of the frame 62 about the rotary shaft 61 is adjusted. By so doing, the position of the reverse-surface support 52 of the cutter unit 50 in the horizontal direction held by the frame 62 can be adjusted. According to this, as illustrated in FIGS. 10A and 10B, even if the posture of the roll sheet 30 that hangs down changes due to the difference between the first usage mode and the second usage mode, in other words, regardless of whether the post-processing apparatus 100 is connected to the inkjet printer 1, the rotation position of the frame 62 about the rotary shaft 61 is adjusted in accordance with the posture of the roll sheet 30. Accordingly, the reverse surface of the roll sheet 30 can be prevented from separating from the reverse-surface support 52. In addition, according to the above-described configuration, in the rotation lifting mechanism 60, the frame 62 is rotatable about the rotary shaft 61 to guide the cutter unit 50 to move in the vertical direction along the frame 62, and the rotation fix member 61*a* fixes an inclination of the frame 62 relative to the vertical direction to fix the position of the cutter unit in the sheet conveyance direction. Accordingly, when the inkjet printer 1 is connected to another apparatus such as a post-processing apparatus of the printed medium, the rotation position of the frame 62 about the rotary shaft 61 is adjusted in accordance with the posture of the roll sheet 30 to fix the inclination of the frame 62 to fix the inclination of the roll sheet 30 in accordance with slacking of the roll sheet 30 conveyed between the inkjet printer 1 and the post-processing apparatus. Thus, the roll sheet 30 can be cut reliably. Also, in the rotation lifting mechanism 60, the cutter unit 50 can be moved to an area in which an image is formed on the roll sheet 30. Thus, an area of the roll sheet 30 that is cut wastefully can be reduced. Accordingly, the cutter housing 51 can reliably cut the roll sheet 30.

The lifting and lowering unit 63 of the present embodiment is a position changer that changes the height position of the cutter unit 50 held by the frame 62. The lifting and lowering unit 63 of the embodiment includes a slide support to slidably support the cutter unit 50 and a slide fix member to fix the cutter unit 50 at one slide position of multiple slide positions.

Specifically, as illustrated in FIG. 11, the lifting and lowering unit 63 includes a lifting block 63*a* to which the cutter unit 50 is attached, and a lifting shaft 63*b*, i.e., a third support, having a screw thread to engage with a screw hole of the lifting block 63*a*. An upper end and a lower end of the lifting shaft 63*b* are rotatably supported by shaft fix members 63*c* fixed to the frame 62. An operation handle 63*d* is disposed at the upper end of the lifting shaft 63*b*.

In the present embodiment, when the operation handle 63*d* is manually operated to rotate the lifting shaft 63*b* about the shaft of the lifting shaft 63*b*, the lifting block 63*a* is guided by the screw thread of the lifting block 63*a* to move up and down about the shaft of the lifting shaft 63*b*. When the operation handle 63*d* is not operated, the position of the lifting block 63*a* is fixed by the static friction force between the lifting shaft 63*b* and the lifting block 63*a*.

Figure 12A:
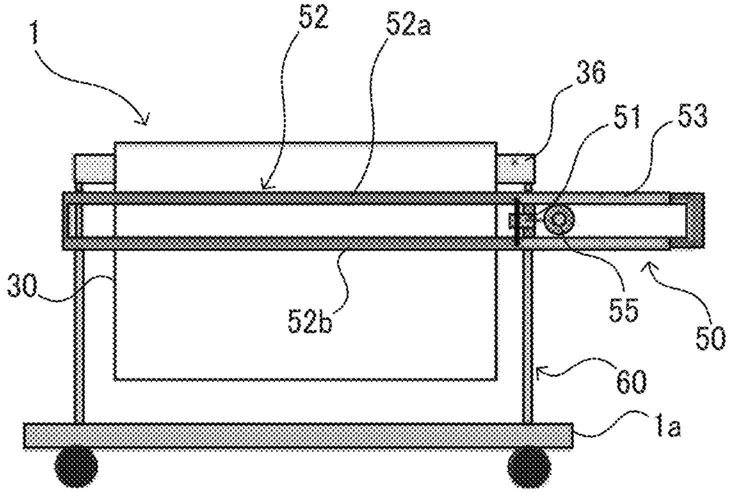
FIG. 12A is a front view of the inkjet printer of FIG. 1, in which the position of a cutter unit is adjusted to be moved to a position close to the ejection position.
Figure 12B:
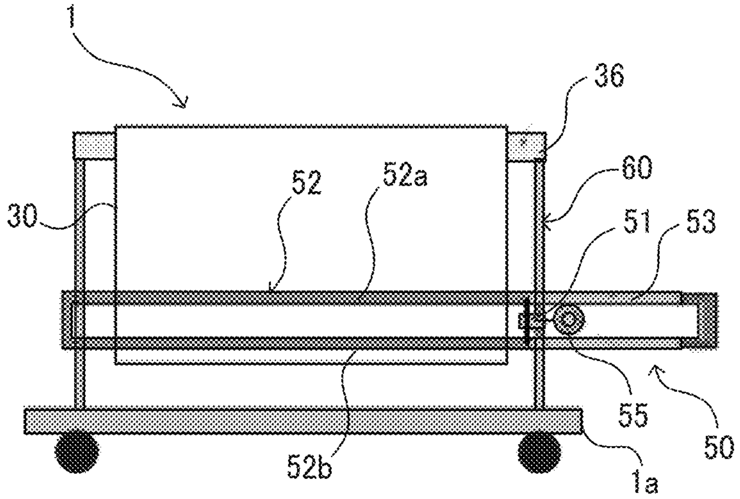
FIG. 12B is a front view of the inkjet printer of FIG. 1, in which the position of a cutter unit is adjusted to be moved to a position away from the ejection position.

According to this configuration, manually operating the operation handle 63*d* of the lifting and lowering unit 63, as illustrated in FIGS. 12A and 12B, can change a distance between the ejection port 1*b* and the cutter unit 50 in the sheet conveyance direction. Accordingly, the cutting position of the roll sheet 30 in the sheet conveyance direction can be appropriately adjusted.

In particular, in the present embodiment, when the rotation position of the frame 62 about the rotary shaft 61 is changed, the distance between the ejection port 1*b* and the cutter unit 50 in the sheet conveyance direction changes before and after the change of the rotation position of the frame 62. Accordingly, the cutting position of the roll sheet 30 in the sheet conveyance direction changes.

In this case, for example, the operation handle 63*d* of the lifting and lowering unit 63 is manually operated to adjust the position of the cutter unit 50. By so doing, the roll sheet 30 can be cut at a similar cutting position before and after the rotation position of the frame 62 about the rotary shaft 61 is changed.

In the present embodiment, the rotation lifting mechanism 60 is also an unpowered mechanism that does not use the power of an electric motor movable by electric power and does not require electrical control. Accordingly, the cutting position of the roll sheet 30 can be adjusted and the roll sheet 30 can be cut without the supply of electric power.

The embodiments described above are just examples, and the various aspects of the present disclosure attain respective effects as follows.

First Aspect

An image forming apparatus includes an image former such as the body 1*b* to eject a recording sheet such as the roll sheet 30 on which an image is formed from an ejection position such as the ejection port 1*b*, a cutting device such as the sheet cutting device 5. The cutting device includes a cutter such as the cutter housing 51 and moves the cutter in a sheet-width direction to cut the recording sheet, the cutting device includes a reverse-surface support such as the reverse-surface support 52 to support a reverse surface of the recording sheet hanging down from the ejection position, a cutter mover such as the front-surface pressing member 53 and the push-out spring 54 to move the cutter in the sheet-width direction along the recording sheet supported by the reverse-surface support, and a mover such as the rotation lifting mechanism 60 to move the cutter to change a position of the reverse-surface support in the horizontal direction.

The image forming apparatus includes the cutting device. The cutting device causes the cutter mover to move the cutter in the sheet-width direction to cut the recording sheet, while supporting a reverse surface of the recording sheet hanging down from the ejection position of the image former with the reverse-surface support. According to this configuration, it is not necessary to dispose the cutting device inside the body of the image forming apparatus. Accordingly, the image forming apparatus can be downsized, and the cutting device can be employed as an optional component of the image forming apparatus.

However, the posture of the recording sheet hanging down from the ejection position of the image former varies depending on the type such as sheet stiffness of the recording sheet. When a post-processing apparatus that performs predetermined post processing on a portion of the recording sheet ejected from the image forming apparatus is connected to the image forming apparatus, the height, i.e., the position in the vertical direction, of an inlet of the post-processing apparatus that receives the portion of the recording sheet may vary depending on the type of the post-processing apparatus. In this case, the posture of the portion of the recording sheet hanging down from the ejection position of the image former varies depending on the type of the post-processing apparatus disposed. When the portion of the recording sheet hanging down varies as described above, the position of the portion of the recording sheet that passes through the height position of the cutting device (a position of the cutting device in the horizontal direction orthogonal to the sheet-width direction) is shifted. Accordingly, the reverse surface of the portion of the recording sheet is separated away from the reverse-surface support. Thus, the recording sheet may not be appropriately cut by the cutter.

For this reason, the image forming apparatus of the first aspect includes the mover to move the cutting device to change the position of the reverse-surface support in the horizontal direction. According to this configuration, even if the posture of the portion of the recording sheet hanging down from the ejection position changes and the position at which the portion of the recording sheet passes through the height position of the cutting device is shifted in the horizontal direction, the mover moves the cutting device to prevent the reverse surface of the portion of the recording sheet from being separated away from the reverse-surface support. Accordingly, the cutting device can reliably cut the recording sheet.

Second Aspect

In the image forming apparatus according to the first aspect, the mover includes a rotary shaft such as the rotary shaft 61, a rotation support such as the frame 62 and a rotation fix member such as the rotation fix member 61*a*. The frame rotatably supports the cutting device about the rotary shaft extending in the sheet-width direction. The rotary fixing member fixes the cutting device at one of multiple rotation positions about the rotary shaft.

According to this configuration, the mover can move the cutting device such that the position of the reverse-surface support in the horizontal direction changes with a simple configuration.

Third Aspect

The image forming apparatus according to the first or second aspect, further includes a position changer such as the lifting and lowering unit 63. The position changer changes the position of the cutting device to change the distance between the ejection position and the cutting device in the sheet conveyance direction. The position changer includes a slide support member such as the lifting shaft 63*b* that slidably supports the cutting device, and a slide fix member such as the lifting block 63*a* that fixes the cutting device at one of multiple slide positions.

Changing the position of the cutting device as described above can adjust the position at which the cutting device cuts the recording sheet in the sheet conveyance direction as appropriate. In particular, in the image forming apparatus according to the third aspect, when the mover moves the cutting device to change the position of the reverse-surface support in the horizontal direction, even if the distance between the ejection position and the cutting device in the sheet conveyance direction changes, the position changer changes the position of the cutting device. By so doing, the recording sheet can be cut at a similar cutting position.

Fourth Aspect

In the image forming apparatus according to any one of the first to third aspect, the cutter mover is an unpowered device.

According to this aspect, the cutter movement mechanism does not require electrical control and can cut the roll sheet 30 without the supply of electric power.

The invention claimed is:

1. An image forming apparatus comprising:

an image former configured to, form an image on a front surface of a sheet; and eject the sheet, on which the image is formed on the front surface, from an ejection port in a first direction;

a cutting device including, a first support configured to support a portion of the sheet hanging down from the ejection port of the image former in a vertical direction intersecting the first direction, the first support supporting a reverse surface opposite to the front surface of the sheet;

a cutter configured to cut the sheet supported by the first support; and a cutter mover configured to move the cutter in a second direction, intersecting the first direction and the vertical direction, along the portion supported by the first support to cut the sheet in the second direction; and a mover configured to change a cutting position of the cutter in the first direction, the cutting position of the cutter being a first position of the cutter in the vertical direction, and, in the first position, the cutter being configured to cut the sheet, wherein the mover includes, an elevator configured to change the first position of the cutter in the vertical direction to change a distance between the ejection port and the cutter in the vertical direction, and the elevator includes, a third support configured to slidably support the cutter; and a second fix member configured to fix the first position of the cutter in the vertical direction.

2. The image forming apparatus according to claim 1, wherein the mover further includes:

a second support configured to rotate about a shaft to guide the cutter to move in the vertical direction along the second support; and a first fix member configured to fix an inclination of the second support relative to the vertical direction to fix a second position of the cutter in the first direction.

3. The image forming apparatus according to claim 1, wherein the cutter mover includes a spring that is configured to move the cutter in the second direction.

* * * * *